Feb. 27, 1923.
L. H. M. LUHRS ET AL.
SLED.
FILED JULY 22, 1921.
1,447,094.
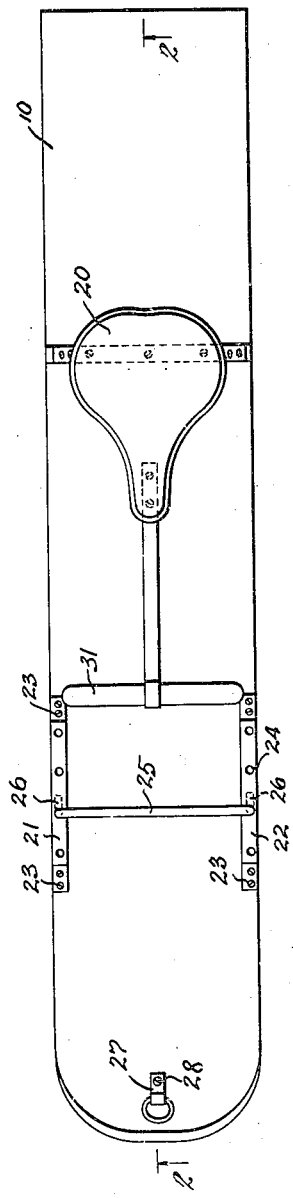
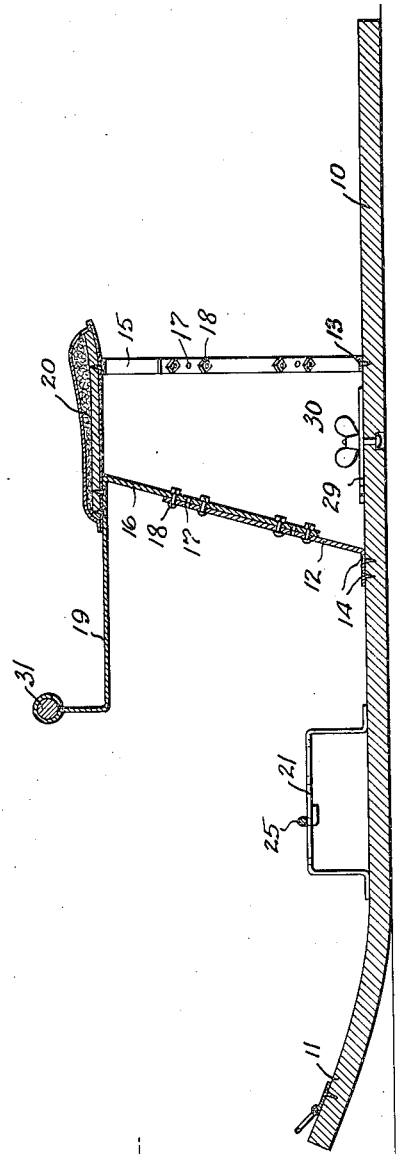
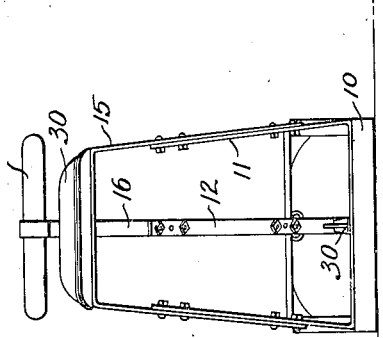
WITNESSES
INVENTORS
L.H.M. LUHRS
A.H. PASSBACK
BY
ATTORNEYS Patented Feb. 27, 1923.

1,447,094

UNITED STATES PATENT OFFICE.

LOUIS H. M. LUHRS AND ALBERT H. PASSBACK, OF NEW YORK, N. Y.

SLED.

Application filed July 22, 1921. Serial No. 486,728.

*To all whom it may concern:*

Be it known that we, LOUIS H. M. LUHRS and ALBERT H. PASSBACK, both citizens of the United States, and residents of the city of New York, borough of the Bronx, in the county of Bronx and State of New York, have invented a new and Improved Sled, of which the following is a full, clear, and exact description.

This invention relates to a sled.

The object of the invention is to provide a sled having a seat and foot rest that may be adjusted to accommodate the individual using the sled.

This object is accomplished by mounting the seat upon an adjustable frame and providing foot rest frames having openings therein in which the foot rest may be connected to retain it in any desired position.

This and other objects of the invention will be more clearly understood from the following detailed description and accompanying drawings.

Figure 1 is a top plan view of the sled;

Figure 2 is a cross section along the line 2—2, Figure 1; and

Figure 3 is an end elevation looking at the sled from the rear.

Referring to the above-mentioned drawings, a board 10 has one end 11 curved upward so as to give the shape of a toboggan or a sleigh runner. Fixed to this board 10 is a seat frame. This seat frame consists of a U-shaped bar 11 and an L-shaped bar 12 connected to the board by means of screws 13 and 14, respectively. Co-operating with the U-shaped bar 11 is another U-shaped bar 15, and with the L-shaped bar 12 a bar 16. A plurality of holes 17 are provided in the U-shaped bars 11 and 15 and also in the bars 12 and 16. Bolts 18 are provided to connect the U-shaped bars 11 and 13 and the other bars 12 and 16. The bar 16 has integral therewith a projection 19 which carries a handle 31. Mounted on the U-shaped bar 15 and the bar 16 is a seat 20 which may be held fixed thereto by any means such as screws.

Mounted in front of the seat are two foot rest frames 21 and 22. These frames are connected to the board by means of screws 23. A plurality of holes 24 are punched in the top of each frame. A foot rest 25 consists of a bar having integral with each end an L-shaped projection 26. These L-shaped projections fit into the holes 24 and serve to retain the foot rest 25 in any desired position.

A ring 27 for drawing the sled is attached to the front by means of a screw 28. A wrench 29 for opening or tightening the nuts on the bolts 13 is connected to the board 10 by any suitable means such as a bolt and wing nut 30.

The seat 20 may be adjusted in height by removing the bolts 18 and lowering or raising the seat until the different sets of holes in the frame coincide and then connecting the two portions of the frame together by means of the bolts 18. The foot rest may be adjusted by engaging the projections 26 in any of the different pairs of holes.

Claim.

A sled, comprising a curved bottom board, an adjustable seat frame carried by the curved bottom board, a seat mounted on the said frame, a handle attached to the seat frame and extending forward from the seat, serving as a balancing means, and an adjustable foot rest mounted on the curved bottom board to serve as a bracing means.

L. H. M. LUHRS.
ALBERT H. PASSBACK.